United States Patent

[11] 3,598,998

| [72] | Inventors | Allan G. Becker<br>Detroit;<br>Ojars Risgin, Grass Lake, both of, Mich. |
|---|---|---|
| [21] | Appl. No. | 761,996 |
| [22] | Filed | Sept. 24, 1968 |
| [45] | Patented | Aug. 10, 1971 |
| [73] | Assignee | The United States of America as represented by the Secretary of the Army |

[54] SINGLE CRYSTAL INFRARED IMAGE CONVERTER
6 Claims, 4 Drawing Figs.

[52] U.S. Cl. .................................................. 250/83.3 HP,
250/71, 250/83.3 H
[51] Int. Cl. ....................................................... G01n 21/00
[50] Field of Search................................................ 250/83.3 H,
83.3 HP, 71

[56] References Cited
UNITED STATES PATENTS
2,920,205 1/1960 Choyke ......................... 250/83.3 HP
3,015,731 1/1962 Van Santen et al........... 250/83.3 HP
3,375,372 3/1968 Miyashita..................... 250/83.3 H
3,415,990 12/1968 Watson ........................ 250/83.3 H

*Primary Examiner*—Archie R. Borchelt
*Attorneys*—Harry M. Saragovitz, Edward J. Kelly, Herbert Berl and J. J. Smith, Jr.

ABSTRACT: This invention relates to a device for converting infrared radiation into visible light in order to make infrared images visible for viewing, detecting, and/or recording. In the converter, a single crystal of zinc sulfide is irradiated by a source of ultraviolet light thereby trapping charge carriers in the crystal at impurity or defect sites in the crystal lattice. The crystal is then exposed to a desired scene of infrared radiation that frees the charge carriers and, through quantum transitions, emits photons thereby producing a visible image of the desired scene. A cryogenic device and optical system are employed to reduce ambient infrared radiation and to increase the converter's sensitivity to radiation of 15 microns and longer.

PATENTED AUG 10 1971

INVENTORS,
ALLAN G. BECKER
OJARS RISGIN.

BY: J J Smith, Jr AGENT
Harry M. Saragovitz,
Edward J. Kelly &
Herbert Berl      ATTORNEYS

SINGLE CRYSTAL INFRARED IMAGE CONVERTER

BACKGROUND OF THE INVENTION

In the past, various devices have been constructed to convert infrared radiation into visible images. There have been the infrared sensitive camera tubes requiring a TV display and including: the image orthicon, based on the use of a photoemissive target material; the vidicon, based on the use of a photoconductive target material; and the thermicon, based on thermionic emission from a target heated by absorption of infrared radiation from the image on the target. Visible light modulators heretofore invented include: the evapograph, based on the evaporation of material from a thin oil film heated by absorption of infrared radiation from the image with the image being made visible by changes in the interference colors of visible light reflected from the oil film; the edgegraph, in which the transmissions of light through a thin film of a semiconductor is varied by changes in the temperature of the film produced by absorption of infrared radiation from a desired scene; and liquid crystals, in which the change in optical rotary power of a thin film of a liquid crystal is produced by a change in temperature of the film caused by the absorption of infrared radiation from the infrared image with the change in optical rotary power producing a change in the color of the film when viewed in polarized light. Previously invented infrared to visible frequency converters include: infrared sensitive image tubes, in which electrons that are freed from a photoemissive target are accelerated and focused by an electric field onto a phosphor thereby producing a visible image by cathodoluminescence; photoconductor-electroluminescent panels, in which absorption of infrared radiation in an infrared sensitive photoconductor layer decreases the resistivity and causes the electric field to be impressed on the electroluminescent layer, producing visible light by electroluminescence; and the metascope, in which infrared stimulation of visible luminescence in a powdered phosphor or photochromic glass previously excited by the absorption of ultraviolet, or nuclear radiation, produces a visible image by luminescence.

All devices heretofore invented and using photoemissive targets, such as the image orthicon and other types of image tubes, are not sensitive to infrared radiation with a wavelength longer than 1.2 microns. All devices using a change in the temperature of the target material, such as the thermicon tube and the evaporagraph, are limited in their speed of response and cannot record changes in a rapidly varying infrared image. They are also limited in their ability to resolve fine detail in the image because of conduction of heat laterally in the sensitive material. The photoconductive-electroluminescent devices are limited in their speed of response by the nature of the photoconductive materials used, and are limited in resolution by the spreading of the electrons released in the photoconductive material and by optical feedback of the light from the electroluminescent layer. The photoconductive camera tubes, such as the vidicon, are limited by the nature of the photoconductive materials used to the recording of wavelengths shorter than 4 microns, and also are limited in resolution by the lateral diffusion of the charge carriers released by the absorption of infrared radiation. A television display system is required to view the image recorded by the camera tube. The metascope and similar luminescent devices have been limited by the phosphor and photochromic glass materials used to infrared wavelengths near 1 micron in wavelength, have had low sensitivity, and have been limited in resolution by the grain structure of the phosphor materials used. The infrared and visible images were formed on the same side of the material, making the design of suitable optical systems difficult.

SUMMARY OF THE INVENTION

The instant invention is based on the infrared stimulation of visible luminescence in single crystals of various materials, principally zinc sulfide, ZnS. It has been found that single crystal ZnS of high optical quality, when irradiated with ultraviolet light, forms electron-hole pairs that are trapped in lattice defect or impurity areas within the single crystal and that upon exposure to infrared radiation, photons are emitted in the resulting electron-hole recombination thereby producing a superior visible image of a desired infrared scene. The single crystal is cooled cryogenically to remove ambient infrared radiation and, in conjunction with suitable optical or electronic multipliers, gives the device greater sensitivity to considerably longer wavelength infrared.

The use of single crystals permits greater thicknesses of target material than is possible with powder phosphors thereby improving the absorption of infrared radiation and improving the resolution of the device.

The visible image produced by the instant invention is presented for viewing, detecting, recording, or otherwise using, on the side opposite the source of infrared radiation thereby greatly simplifying the design of the appropriate optical and/or electronic system.

The employment of single crystal ZnS with a cryogenic device operated at the temperature of liquid helium, about 4° K., increases the sensitivity of the device out to 15 microns which is significantly longer than the 4-micron cutoff of the best infrared sensitive camera tubes.

Although zinc sulfide is employed in the preferred embodiment hereinafter explained, self-activated zinc sulfide as well as zinc selenide may be employed with good results.

The device of the instant invention requires no scanning of the object plane by a rotating mirror or similar device commonly used in infrared scanners. Likewise, complex electronic display systems are not required since it is possible either to view the visible image directly or to amplify the visible image with an image intensifier tube. If contrast enhancement is desired to display small differences in infrared intensity in the image with high contrast, low light level television systems may be used to detect and display the visible image produced by the image converter.

The physical size and weight of the image conversion system of the instant invention allows the device to be fabricated in a substantially smaller package than existing infrared imaging devices thereby extending the range of applications of such image converter. The reliability and ruggedness of the image converter is superior to existing systems because of the simplicity of the device.

BRIEF DESCRIPTION OF THE DRAWING

The exact nature of this invention will be readily apparent from consideration of the following specification relating to the annexed drawing in which.

DESCRIPTION OF THE PREFERRED EMBODIMENT

Figure 1:
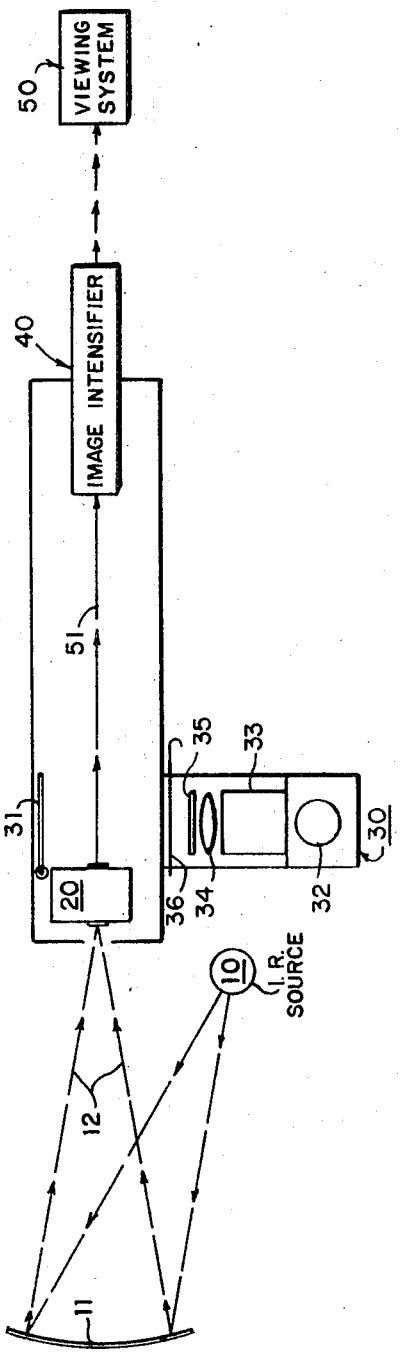
FIG. 1 shows a schematic diagram of the preferred embodiment of the image converter of the instant invention.

Referring now to the drawings, there is shown in FIG. 1 the preferred embodiment of the image converter of the instant invention. Briefly, infrared energy 12 from a selected IR source 10 is reflected onto collecting mirror 11 and thence to crystal means 20. Collecting mirror 11 had an effective $f/4$ aperture in the device actually constructed; however, other apertures may be employed with predictably suitable results. Crystal means 20 contains the single crystal zinc sulfide, hereafter described with respect to FIG. 2, that has been stimulated, pumped, or exposed to ultraviolet radiation from UV source 30 thereby producing a visible image 51 that passes through image intensifier 40 and subsequently to viewing system 50. It should be mentioned that visible image 51 may be viewed or photographed directly or through a conventional starlight scope image intensifier or other viewing or display system as shown in FIG. 1.

Flip-in mirror 31 is positioned near crystal means 20 so that crystal means 20 may be properly irradiated. Ultraviolet source 30 may be of any standard or conventional design; however, the UV source actually employed consisted of an AH-4 mercury arc lamp 32, a water filter 33 to absorb IR, quartz focusing lens 34, Corning 7-54 UV filter 35, and shutter mechanism 36. The UV excitation is continued until all the traps in the crystal means 20 are filled with charge carriers and then the excitation is terminated. It is noted that other embodiments may be designed with continuously operating UV sources or with pulsed flash lamp UV sources.

Figure 2:
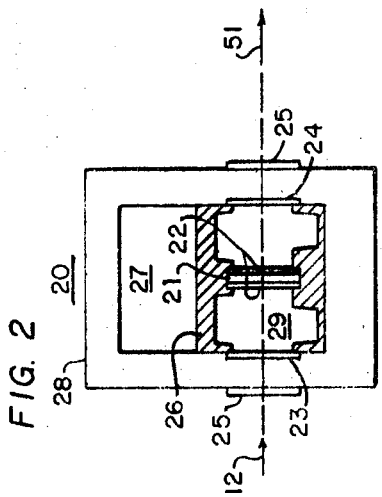
FIG. 2 shows an expanded view of the single crystal means 20 of FIG. 1.

Referring now to FIG. 2, crystal means 20 is formed by placing a ZnS single crystal plate 21 between sapphire plates 22. Crystal plate 21 and sapphire plates 22 are held in place by support 26 with germanium filter 23 and IR absorbing filter 24 enclosing void or vacuum 29. Cryogenic reservoir 27 is juxtaposed support 26 so as to eliminate as much ambient IR as desired. A silvered glass Dewar 28 containing sapphire windows 25 is placed about support 26 and reservoir 27. Sapphire windows 25 and plates 22 could be fabricated of any IR, UV, and visible light-transmitting materials. Likewise, germanium filter 23 could be made from any material that traps stray radiation and effectively transmits only IR. Although IR absorbing filter 24 was constructed of Corning glass 1-69, other suitable IR absorbing filter materials could obviously be used. Sapphire plates 22 are employed as supports for crystal plate 21 and are thus not necessary with a different type support 26. In the device actually constructed, the ZnS crystal plate 21 was fabricated with a diameter of approximately 0.5 inches and the apertures closed by filters 23 and 24 likewise being approximately 0.5 inches. Single-crystal plates 21 of ZnS were cut from samples grown and treated in the following manner to produce material suitable for imaging: the samples were heated to approximately 1,173° K. in carefully cleaned quart capsules with at least 10 times their weight of high purity (99.9999 percent nominal) metallic zinc. The crystals were then etched lightly in concentrated HCl to remove adherent zinc particles, washed carefully, and sealed in evacuated quartz capsules. They were then heat treated for 24 to 48 hours at about 1,223° K., followed by rapid air-cooling to room temperature. Apparently some further out-diffusion of impurities occurred, because the material which sublimed from the crystals showed a green copper luminescence while the treated crystals themselves did not. The crystals showed a sufficiently long wavelength response to be used in imaging experiments even though they originally showed very poor stimulation response.

Figure 3:
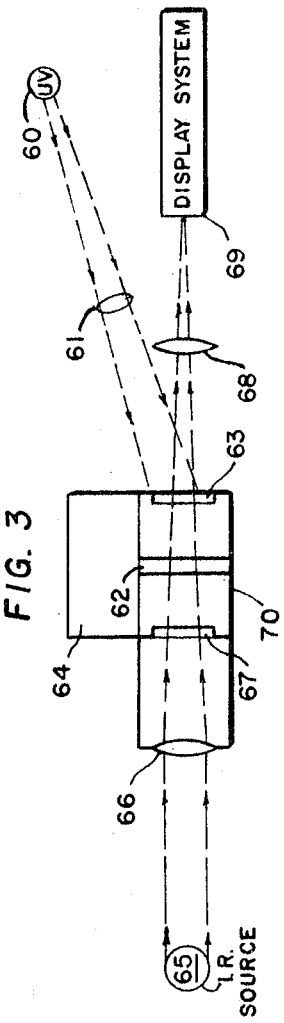
FIG. 3 shows a schematic diagram of an alternative form of the preferred embodiment.

Referring now to FIG. 3, there is shown an alternative form of the preferred embodiment that is constructed in such a manner as to eliminate flip-in mirror 31 of the device as shown in FIG. 1. UV radiation from a source 60 is focused by an appropriate optical system 61 onto the single crystal 62 through filter 63 which transmits visible and ultraviolet light but absorbs all infrared radiation. The crystal is cooled below ambient temperature by thermal contact with a cryogenic means 64. Infrared radiation from a scene 65 is collected by an appropriate optical system 66 and focused onto the crystal 62 forming an infrared image thereon. A filter 67 transmits only the desired infrared wavelengths. Infrared stimulation of visible luminescence produces a visible luminescent image in the crystal. The visible light from the crystal is focused by an appropriate optical system 68 onto the display system 69 where the light may be detected and/or recorded. The crystal is surrounded by a shield 70 cooled by thermal contact with the cryogenic means 64 which also cools the filters 63 and 67 mounted on the shield 70.

Figure 4:
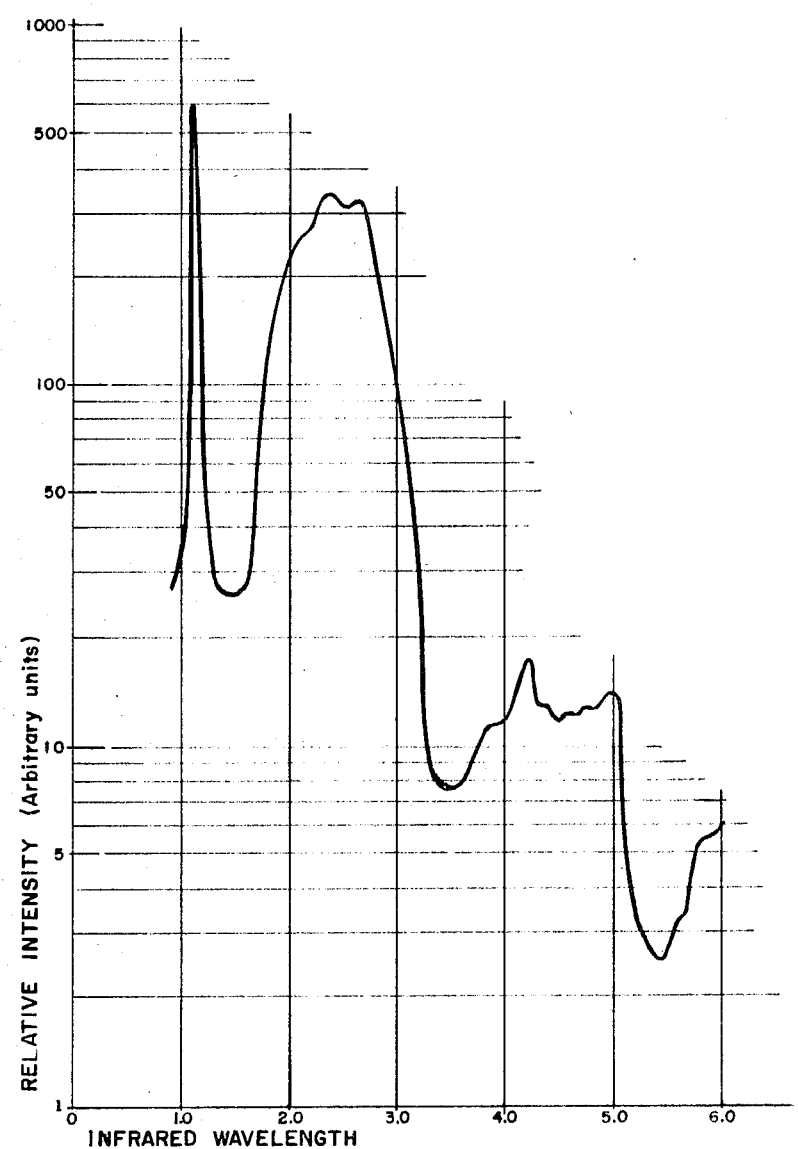
FIG. 4 is a plot of the spectral response of infrared stimulation in ZnS for a constant infrared irradiance.

Referring now to FIG. 4, there is seen a plot of Relative Intensity of the visible luminescence in arbitrary units versus Wavelength of constant infrared radiation. The particular plot is taken with a UV saturation time of about 2 minutes at approximately 4,200° A. The UV excitation may be varied in wavelength but little difference is found in Relative Intensity with excitating in the vicinity of 3,500° A.

Although not shown in FIG. 4, it has been found that the visible luminescence output from the instant invention is essentially directly proportional to the intensity of the infrared source thus making the device linearly responsive. A response time of approximately 0.17 milliseconds has been observed giving the converter a short persistence with no difficulty in following a moving IR source.

It should be understood, of course, that the foregoing disclosure relates to only preferred embodiments of the invention and that numerous modifications or alterations may be made therein without departing from the spirit and the scope of the invention as set forth in the appended claims.

What we claim is:

1. A device for converting infrared radiation into visible light, comprising:
   a crystal means for receiving infrared energy, said crystal means comprising a high optical quality, single crystal that is responsive to long wavelength radiation;
   an ultraviolet means for selectively irradiating the entire surface of said crystal means;
   a cryogenic means for cooling said crystal means;
   an optical system arranged to focus infrared radiation onto said crystal means thereby producing a visible image on said crystal means, and;
   means for viewing said visible image.

2. The infrared converter according to claim 1 wherein said crystal means has two faces;
   said ultraviolet means on one face thereof, and;
   said infrared energy is focused on the other face of said crystal means thereby producing a visible image on said single crystal means on said one face thereof.

3. The infrared converter according to claim 1 wherein said single crystal is composed of zinc sulfide.

4. The infrared converter according to claim 1 wherein said single crystal is composed of self-activated zinc sulfide.

5. The infrared converter according to claim 1 wherein said single crystal is composed of zinc selenide.

6. The infrared converter according to claim 1 wherein said ultraviolet means is comprised of an ultraviolet source and a mirror that is so pivoted as to allow selective irradiation of said crystal means.